United States Patent [19]

Naae et al.

[11] Patent Number: 4,781,251
[45] Date of Patent: Nov. 1, 1988

[54] RECOVERING HYDROCARBONS WITH WATER SOLUBLE ALKYLPHENOL LIGNIN SURFACTANTS

[75] Inventors: Douglas G. Naae, Houston; Francis E. DeBons, Richmond, both of Tex.

[73] Assignee: Texaco Inc., White Plains, N.Y.

[21] Appl. No.: 127,850

[22] Filed: Dec. 2, 1987

[51] Int. Cl.$^4$ .............................................. E21B 43/22
[52] U.S. Cl. ..................................... 166/274; 166/273; 252/8.554; 530/502
[58] Field of Search ...................... 166/273, 275, 305.1; 252/8.554

[56] References Cited

U.S. PATENT DOCUMENTS

| | | | |
|---|---|---|---|
| 3,325,426 | 6/1967 | Markham | 530/502 X |
| 3,686,119 | 8/1972 | Jantzen | 530/501 |
| 4,219,082 | 8/1980 | Kalfoglou | 166/273 |
| 4,236,579 | 12/1980 | Kalfoglou | 166/273 X |
| 4,444,562 | 4/1984 | Lin | 106/316 X |
| 4,479,542 | 10/1984 | Warchol et al. | 166/273 |
| 4,548,721 | 10/1985 | De Bons et al. | 166/274 X |
| 4,739,041 | 4/1988 | Morrow et al. | 166/275 X |

Primary Examiner—George A. Suchfield
Attorney, Agent, or Firm—Jack H. Park; Kenneth R. Priem; Harold J. Delhommer

[57] ABSTRACT

The invention is a method of recovering hydrocarbons with a surfactant flooding system, wherein the surfactant slug comprises about 0.1% to about 10% by weight of an alkylphenol lignin surfactant. The alkylphenol lignin surfactant is produced by reacting an alkylphenol having about 6 to about 15 carbon atoms in the alkyl chain with formaldehyde in basic solution at a temperature of about 50° to about 120° C. for about 15 minutes to about 3 hours to form a first reaction product. The first reaction product is then reacted with a kraft lignin in solution at a temperature of about 100° to about 160° C. for about 30 minutes to about 5 hours to form an alkylphenol lignin reaction product. Finally, the alkylphenol lignin reaction product is made more water soluble by subjecting the alkylphenol lignin reaction product to a reaction selected from the group consisting of sulfonation, sulfation, alkoxysulfonation, alkoxysulfation, and alkoxylation to produce the alkylphenol lignin surfactant.

14 Claims, No Drawings

RECOVERING HYDROCARBONS WITH WATER SOLUBLE ALKYLPHENOL LIGNIN SURFACTANTS

BACKGROUND OF THE INVENTION

This invention relates to a method of recovering oil from subterranean formations with surfactant flooding systems that incorporate water soluble surfactants produced from an alkylphenol and kraft lignin.

Surface active compounds or surfactants have become extremely important chemicals in our society. Numberless types of surfactants are used for a myriad of applications. To work effectively, surfactants require water soluble and oil soluble characteristics. It is these mixed characteristics which enable surfactants to lower the interfacial tension between two disparate liquids.

One problem with many surfactants is their high cost of manufacture. Surfactants which are relatively cheap have an inherent advantage in the market place.

A minor use of surfactants has been in surfactant flooding systems for enhanced oil recovery. Because of the relatively high cost of surfactants, surfactant flooding systems for oil recovery have generally not been economical. The economics of surfactant flooding have additionally become more unfavorable recently with the low price of oil. But it is hoped that surfactant use in enhanced oil recovery will expand in the future.

Surfactant flooding to recover oil has been actively investigated due to the relatively poor ability of water floods to displace remaining oil from a reservoir's pore structure. Because of the structure of the reservoir and relative interfacial tensions involved, the flood water may form channels or fingers, bypassing the oil in the formation. Even where water has flowed, residual oil is trapped in pores by viscous and capillary forces. Further flooding with water will not remove such oil.

Investigations of ways to increase oil recovery by improving the displacement ability of water floods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a water flood operation is dependent upon reservoir characteristics as well as the cost and availability of the surfactants.

Most surfactant floods have employed a petroleum sulfonate as a sole surfactant, or at least a major component of a mixture of surfactants. Synthetic alkyl benzene sulfonates and alkyl sulfonates and sulfates have also been proposed as oil recovery surfactants. To combat separation problems in surfactant mixtures, especially at high salinities (>2% salt), a material with both water soluble and oil soluble characteristic sulfonate surfactant mixtures. These materials are generally referred to as "solubilizers" and are usually sulfate or sulfonate salts of polyethoxylated alcohols or alkylphenols. The choice and concentration of solubilizer employed is dependent upon the choice of surfactants used, their overall concentration, and salinity.

U.S. Pat. No. 4,444,562 discloses a thermosol dyeing process for textiles which uses a reaction product formed by reacting an alkylphenol having from 1 to 4 carbons in the alkyl chain with formaldehyde and then with a lignosulfonate. The patent only discloses use in a fabric dyeing, which requires high water solubility. Consequently, highly polar lignosulfonates only are reacted with short chain alkylphenols to produce highly water soluble products.

SUMMARY OF THE INVENTION

The invention is a method of recovering hydrocarbons from an underground hydrocarbon formation penetrated by at least one injection well and at least one production well, which comprises injecting a surfactant slug through an injection well, wherein the surfactant slug comprises about 0.1% to about 10% by weight of an alkylphenol lignin surfactant, injecting through the injection well a drive fluid to push the surfactant slug towards a production well, and recovering hydrocarbons at the production well.

The alkylphenol lignin surfactant is produced by reacting an alkylphenol having about 6 to about 15 carbon atoms in the alkyl chain with formaldehyde in basic solution at a temperature of about 50° to about 120° C. for about 15 minutes to about 3 hours to form a first reaction product. The first reaction product is then reacted with a kraft lignin in solution at a temperature of about 100° to about 160° C. for about 30 minutes to about 5 hours to form an alkylphenol lignin reaction product. Finally, the alkylphenol lignin reaction product is made more water soluble by subjecting the alkylphenol lignin reaction product to a reaction selected from the group consisting of sulfonation, sulfation, alkoxysulfonation, alkoxysulfation, and alkoxylation to produce the alkylphenol lignin surfactant.

DETAILED DESCRIPTION

The invention surfactant flooding system may be formulated to employ the alkylphenol lignin surfactants as sole surfactants, co-surfactants, or solubilizers. Such alkylphenol lignin surfactants may also be used to substitute for a certain percentage of an existing surfactant in a surfactant flooding system to lower the overall cost of the surfactants employed in the flooding system. These surfactants provide extremely low interfacial tension between oil and water, and form stable surfactant systems with many of the commercially available enhanced oil recovery surfactants now on the market.

It is well known that conventional surfactant flooding mixtures are usually composed of one or more petroleum, petrochemical or synthetic sulfonates, a solubilizer or co-surfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 20% of the pore volume of the reservoir with a total surfactant and solubilizer concentration of about 0.1% to about 10%, preferably about 0.1% to about 5% by weight. A typical surfactant system may be:

1. one or more petroleum sulfonates such as
   (a) a water soluble sulfonate having a relatively low equivalent weight, and
   (b) an oil soluble sulfonate having a relatively high equivalent weight, or
   (c) any other commercially available petroleum sulfonates;
2. a solubilizer or co-surfactant;
3. brine; and 4. optionally, a light hydrocarbon.

As mentioned before, surfactant flooding systems can be formulated under some conditions without a solubilizer and with only a sole surfactant. Petrochemical and synthetic sulfonates may be substituted for petroleum sulfonates. The surfactant slug may also contain or be preceded by a sacrificial agent. The present invention resides in the use of about 0.1% to about 10% concentration by weight of alkylphenol lignin surfactants in any surfactant flooding system to recover underground hydrocarbons, wherein the lignin surfactants are prepared according to the described process.

Surfactant systems are generally pushed through the formation towards a production well by the subsequent injection of a drive fluid. The drive fluid is usually water, gas, or water viscosified by a polymer. Hydrocarbons and other polymers are then recovered at one or more production wells.

Although certain lignin and lignosulfonate compounds have been disclosed for use in enhanced oil recovery systems, they provide different properties in a surfactant system than the alkylphenol kraft lignin surfactants prepared according to the described process. All of these compounds have different solubilities. Kraft lignins themselves are less water soluble than lignosulfonates. When kraft lignins are combined with alkylphenol compounds, particularly those having about 6 to about 15 carbon atoms in the alkyl chain, the new compounds become even less water soluble due to the hydrophobic nature of the alkylphenol. In fact, these lignin derivatives are generally insoluble in water or brine. They destabilize petroleum sulfonate systems. Simply adding an alkylphenol group to kraft lignin does not produce a surfactant. But by subjecting the alkylphenol lignin reaction product to a reaction such as sulfonation, sulfation, alkoxysulfonation, alkoxysulfation or alkoxylation, the water and brine solubility of the product is substantially improved. This combination of the hydrophobic alkylphenol lignin portion of the surfactant and the hydrophilic group provides a water soluble and brine tolerant surfactant product which works well in enhanced oil recover surfactant systems.

The alkylphenol lignin surfactant is produced by reacting an alkylphenol having about 6 to about 15 carbon atoms in the alkyl chain, preferably about 8 to about 12 carbon atoms in the alkyl chain, with formaldehyde in the presence of hydroxide ions at a temperature of about 50° to about 120° C., for about 15 minutes to about 3 hours to form a first reaction product. Although they are more expensive, higher molecular weight aldehydes should also be acceptable substitutes for formaldehyde. Compounds which generate formaldehyde in situ, such as paraformaldehyde, may also be substituted for formaldehyde.

The reaction solvent medium may be aqueous or organic. A mixture of both, such as water and isopropanol, is preferred for the first reaction step to better mix the two reactants and to increase the amount of the two reactants in solution.

Alkali is needed for effective preparation of the first reaction product. Preferably, the alkylphenol will be reacted in the presence of a sufficient amount of sodium hydroxide or other alkali capable of creating a basic solution. The sodium hydroxide is employed to maintain the reaction pH between about 8 and about 13 as well as increase the solubility of the alkylphenol in the aqueous solution. Sodium hydroxide concentration may range from about 1% to about 15%, preferably about 5% to about 10% by weight, based upon the amount of alkylphenol. Other possible sources of alkali are potassium hydroxide, sodium carbonate, and potassium carbonate. Most preferably, the initial solution of alkylphenol and sodium hydroxide is heated to reflux temperature and maintained at reflux temperature for a period of about 30 minutes to about 2 hours to form a first reaction product.

To produce the desired methylol hydroxybenzene first reaction product, it is necessary to control the degree of methylolation as indicated in the examples. Excess formaldehyde and a long reaction time eventually yields a bakelite type of product which is not the desired first reaction product. As will be appreciated to those skilled in the art, the degree of methylolation and the desired reaction endpoint can be determined by analysis for residual formaldehyde. Once the reaction endpoint is known, the degree of methylolation can be controlled by introducing formaldehyde in a molar proportion corresponding to the desired ratio of hydroxymethyl to hydroxybenzene moieties, and carrying the reaction through to completion.

The first reaction product is then reacted with a kraft lignin in a preferred stoichiometric ratio of about 1 to about 1, lignin to alkylphenol, based on the titratable phenolic hydroxyls. The reaction is preferably performed in a mixed reaction solvent such as isopropanol and water. Although not required, a compound such as sodium hydroxide, potassium hydroxide, sodium carbonate, potassium carbonate or other similar compounds should be added to the reaction solvent to increase lignin solubility. Since kraft lignins are generally not soluble in an acidic aqueous environment, sufficient alkali compound should be added to give the reaction mixture a pH greater than 7.

The second reaction should be performed at a temperature of about 100° to about 160° C. for a time period of about 30 minutes to about 5 hours to form an alkylphenol lignin product. Most preferably, the temperature range of the second reaction is about 110° to about 130° C. and the time period of the reaction is about 2 hours to about 3 hours.

Although it is not necessary, the effectiveness of the alkylphenol lignin surfactant is improved by extracting the alkylphenol lignin reaction product with an organic solvent and discarding that part of the reaction product dissolved in the organic solvent. Preferred extraction solvents are ether, diethylether, tetrahydrofuran, benzene and toluene. The extraction solvent is removed by evaporation or distillation, leaving the preferred reaction product available for the final reaction step.

The alkylphenol lignin reaction product is more oil soluble and less water soluble. Consequently, it is not very useful as an enhanced oil recovery surfactant. But the aromatic ring and phenolic hydroxyl provide reaction sites for further chemical reactions which can improve water solubility while maintaining the hydrophobic portion of the compound.

To transform the alkylphenol lignin reaction product into a surfactant that is at least partially water soluble, one or a combination of reactions are performed, including alkoxylation with ethylene oxide, propylene oxide, or butylene oxide, sulfonation, sulfation, alkoxysulfonation, and alkoxysulfation. All of these reactions convert the alkylphenol lignin to products that are water soluble as well as surface active. Other modifications are of course possible with these alkylphenol lignins to produce surfactant products.

The most preferred reaction is sulfonation by sulfomethylation. The alkylphenol lignin reaction product may be reacted in an aqueous solvent with sodium sulfite in the presence of sodium hydroxide and aqueous formaldehyde. Of course, other sulfonation methods such as sulfonation by sulfuric acid and sulfur trioxide-dioxane complex may be employed. The sulfur trioxide-dioxane method must be performed under anhydrous conditions. In the presence of water, the preferred reaction is the formation of sulfuric acid.

Sulfonation by sulfuric acid is not preferred because it is a vigorous reaction and more likely to attack or cleave the lignin bonds. Lignin in acid tends to break down and recombine to form higher molecular weight derivatives which will not be water soluble. It may be possible to sulfonate with sulfuric acid under pH controlled conditions such as employed in sulfite pulping. However, sulfite pulping also tends to break down lignin.

Trimethylamine-sulfur trioxide complex sulfation and chlorosulfonic acid sulfation in an anhydrous reaction medium are the most preferred sulfation reactions. Sulfation methods are described in U.S. patent application Ser. No. 06/946,270, filed Dec. 24, 1986, which is incorporated herein by reference.

Alkoxylation is also a highly successful method for producing water soluble surfactants from alkylphenols having low interfacial tensions. Ethoxylation is especially preferred. Ethoxylated, or ethoxylated and propoxylated lignin phenols having about 4 to about 20 alkylene oxide groups have also been found to be effective surfactants. Propoxylation and butoxylation reactions are more costly and will generally not create a water soluble surfactant without the addition of a hydrophilic group such as a sulfonate or sulfate.

The sulfation or sulfonation of alkoxylated alkylphenol lignins having about 4 to about 20 alkylene oxide groups also produces highly effective surfactants. Other combinations which may prove effective include alkoxylation with blocks of two different alkylene oxides, and alkoxylation followed by sulfonation or sulfation.

The following examples will further illustrate the method of the present invention wherein a surfactant flood is conducted with alkylphenol lignin surfactants prepared according to the above description. These examples are given by way of illustration and not as limitations on the scope of the invention. Thus, it should be understood that reaction steps and amounts may be varied with the process still remaining within the scope of the invention.

EXAMPLES

These reaction runs were performed in high pressure, high temperature reactors. Several different lignins were employed in the experimental runs. Indulin C is a trademarked pine kraft lignin product sold by Westvaco Corp. It is a spray dried powder comprising 72% kraft lignin with the remainder being inorganic salts and hemicellulose.

Commercial surfactants used in the examples were TRS-18 and TRS-40. TRS-18 is a trademarked oil soluble surfactant having an equivalent weight of about 520 sold by Witco Chemical Co. TRS-40 is a trademarked water soluble surfactant having an equivalent weight of about 350 formerly sold by Witco Chemical Co. Adogen 170, a trademarked tallow primary amine having about a 95% purity sold by Sherex Chemical Co., was also employed in a surfactant system.

EXAMPLE 1

5 grams (22.7 meq) of p-nonylphenol and 0.42 grams (10.6 meq) of sodium hydroxide were dissolved in a mixture of 25 milliliters of water and 25 milliliters of isopropyl alcohol. The solution was heated to reflux and 3.72 grams of 37% aqueous formaldehyde (45.9 meq) were added.

After one hour of reflux, the solution was cooled to room temperature and mixed with 10 grams (20.2 meq titratable phenolic hydroxyls) of Indulin C and 0.5 grams (12.5 meq) of sodium hydroxide in a solution of 50 milliliters of water and 50 milliliters of isopropyl alcohol. The reaction mixture was cooked at 120° C. for 2.5 hours in a Parr reactor. These reactions were performed in a sealed reaction system to avoid the loss of solvent.

Removal of the water by azeotropic distillation with toluene removed a toluene soluble fraction that was predominantly polymerized methylol alkylphenol and a small amount of lignin. This left 14 grams of toluene insoluble nonylphenol kraft lignin product. Analysis indicated 48% incorporation of alkylphenol onto the lignin.

The toluene insoluble product was sulfonated by the sulfomethylation method in 200 milliliters of water and isopropanol in a 1 to 1 ratio. To the reaction product from 5 grams of p-nonylphenol and 10 grams of Indulin C was added 1.0 grams of sodium hydroxide, 2.5 grams of sodium sulfite, and 1.5 grams of 37% aqueous formaldehyde. The mixture was cooked at 170° C. for 1.5 hours in a Parr reactor. The solvent was removed with a rotary evaporator. The dried alkylphenol lignin surfactant was employed in the corefloods of Examples 3–5 and 11.

EXAMPLE 2

The procedure of Example 1 was followed with 5.97 grams (22.8 meq) of p-dodecylphenol substituted for p-nonylphenol. This procedure yielded a 40% incorporation of p-dodecylphenol onto the lignin. The alkylphenol lignin reaction product was also sulfonated in the same manner as Example 1. The corefloods of Examples 6–8 and 12 were run with this surfactant.

EXAMPLES 3–10

The alkylphenol lignin surfactants of Examples 1 and 2 were first tested for salt tolerance, hardness tolerance, interfacial tension ability in aqueous solutions against an Illinois crude oil and toluene, and stability effect on petroleum sulfonate systems. They showed excellent high salinity surfactant properties, low interfacial tensions and good stability characteristics.

Coreflood evaluations were then performed on stable blends of 1% alkylphenol lignin surfactant and 1% petroleum sulfonate blend for the Example 1 product (Examples 3-5) and the Example 2 product (Examples 6-8). The 1% Witco blend was comprised of 0.46 wt % of TRS-18 and 0.54 wt % of TRS-40. Examples 9 and 10 were corefloods run with 1% Witco blend and 2% Witco blend, respectively, for comparison purposes.

Illinois well supply water (WSW) was employed in varying volume amounts as the makeup water of the surfactant solutions. The Illinois well supply water had a salinity of 35,000 ppm TDS with 640 ppm of divalent cations.

Berea sandstone was cut into 2"×2"×12" cores and cast in epoxy. Each core was evacuated by a vacuum pump and saturated with the WSW brine. The cores typically had a 150 milliliter pore volume, a porosity of about 0.21–0.22 and a permeability of about 250–500 millidarcies.

Each core was flooded at a frontal advance rate of about 10 feet per day with an Illinois crude oil having a density of 0.84 grams per milliliter and a viscosity of 6.4 centipoise. Flooding with the oil continued until water production ceased. Each core was then flooded with the WSW brine at a rate of 5 feet per day until waterflood residual oil saturation was reached.

The surfactant slug comprised a 0.25 pore volume slug of 1% alkylphenol lignin and 1% Witco blend in various blends of WSW brine and fresh water as noted in Table 1. 0.12% Nalflo 550, a trademarked partially hydrolyzed polyacrylamide sold by Nalco Chemical Co., was added to the surfactant slug as a viscosifier. The surfactant slug was then followed by a continuous polymer drive having 1500 ppm Nalflo 550 in fresh water. As can be seen by Table 1, the alkylphenol lignin surfactants of Examples 1 and 2 provided excellent coreflood results, even in saline surfactant slugs.

TABLE 1

COREFLOOD RESULTS FOR 1% SULFOMETHYLATED ALKYLPHENOL LIGNIN WITH 1% WITCO BLENDS

| Examples | Alkylphenol with 1% Witco Blend | 20% WSW | | 40% WSW | | 60% WSW | |
|---|---|---|---|---|---|---|---|
| | | $S_{ocf}$ | % $E_R$ | $S_{ocf}$ | % $E_R$ | $S_{ocf}$ | % $E_R$ |
| 3–5 | Nonyl | 0.08 | 79 | 0.11 | 73 | 0.12 | 69 |
| 6–8 | dodecyl | 0.09 | 75 | 0.10 | 73 | 0.10 | 74 |
| 9 (1% Witco Blend) | | 0.10 | 71 | — | — | — | — |
| 10 (2% Witco Blend) | | 0.06 | 85 | — | — | — | — |

EXAMPLES 11–12

The performance of the Example 1 and 2 surfactants in a ternary system of lignin, amine, and petroleum sulfonate was determined in Examples 11 and 12 of Table 2. 0.6% by weight of the Example 1 and 2 surfactants were mixed with 0.1% by weight of Adogen 170, and the resulting mixture was solubilized with 1.3% TRS-40 in 20% WSW. This gave a ternary alkylphenol lignin surfactant/amine/petroleum sulfonate blend at 2% active concentration. Corefloods were run according to the procedure of Examples 3–10. The residual oil saturation after coreflood and the recovery efficiencies reported in Examples 11 and 12 of Table 2 were comparable to other lignin amine surfactant systems that have been tested.

TABLE 2

COREFLOOD RESULTS FOR 0.1% ADOGEN 170/0.6% ALKYLPHENOL LIGNIN/1.3% TRS-40 IN 20% WSW

| Examples | Alkylphenol Lignins | $S_{ocf}$ | $E_R$, % |
|---|---|---|---|
| 11 | Ex. 1 nonyl | 0.11 | 72 |
| 12 | Ex. 2 dodecyl | 0.10 | 72 |

Many variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:

injecting through an injection well a surfactant slug comprising about 0.1% to about 10% by weight of an alkylphenol lignin surfactant, said alkylphenol lignin surfactant produced by reacting in basic solution an alkylphenol having about six to about 15 carbon atoms in the alkyl chain with formaldehyde at a temperature of about 50° to about 120° C. for about 15 minutes to about 3 hours to form a first reaction product, reacting the first reaction product with a kraft lignin in solution at a temperature of about 100° to about 160° C. for about 30 minutes to about 5 hours to form an alkylphenol lignin reaction product; and increasing the water solubility of the alkylphenol lignin reaction product by a reaction selected from the group consisting of sulfonation, sulfation, alkoxysulfonation, alkoxysulfation, and alkoxylation to produce the alkylphenol lignin surfactant;

injecting through the injection well a drive fluid to push the surfactant slug towards a production well; and recovering hydrocarbons at the production well.

2. The method of claim 1, further comprising the use of an additional surfactant in the surfactant slug.

3. The method of claim 1, wherein the surfactant slug is additionally comprised of compounds other than surfactant.

4. The method of claim 1, wherein the first reaction product and kraft lignin are reacted at a temperature of about 110° to about 130° C.

5. The method of claim 1, wherein the alkylphenol has an alkyl chain of about 8 to about 12.

6. The method of claim 1, wherein the the alkylphenol and formaldehyde are refluxed together for about 30 minutes to about 2 hours at a temperature of about 70° to about 90° C.

7. The method of claim 1, wherein the first reaction mixture is made basic by the addition of sufficient sodium hydroxide, potassium hydroxide, sodium carbonate or potassium carbonate.

8. The method of claim 1, further comprising adding sodium hydroxide, potassium hydroxide, sodium carbonate or potassium carbonate to the reaction mixture of the first reaction product and kraft lignin in a quantity sufficient to give the reaction mixture a pH greater than 7.

9. The method of claim 1, further comprising extracting the alkylphenol lignin reaction product with an organic solvent; drying the organic insoluble product; and increasing the water solubility of the organic insoluble product by one of the reactions selected from the group consisting of sulfonation, sulfation, alkoxysulfonation, alkoxysulfation, and alkoxylation.

10. The method of claim 9, wherein the organic solvent is ether, diethylether, tetrahydrofuran, benzene, or toluene.

11. The method of claim 1, wherein the reaction solution for the alkylphenol and formaldehyde reaction is a mixture of water and an organic solvent.

12. The method of claim 1, wherein the reaction solution for the first reaction product and the kraft lignin is a mixture of water and an organic solvent.

13. The method of claim 1, wherein sulfonation is performed by sulfomethylation.

14. A method of recovering hydrocarbons from an underground hydrocarbon formation penetrated by at least one injection well and at least one production well, which comprises:

injecting through an injection well a surfactant slug comprising about 0.1% to about 5% by weight of an alkylphenol lignin surfactant, said alkylphenol lignin surfactant produced by refluxing a mixed solution of water and isopropanol containing formaldehyde and an alkylphenol having about 8 to about 12 carbon atoms in the alkyl chain in the presence of sufficient sodium hydroxide or potassium hydroxide to make the solution basic at a temperature of about 70° to about 90° C. for about 30 minutes to about 2 hours to form a first reaction product, reacting the first reaction product with a kraft lignin in a mixed solvent of water and isopropanol containing sufficient sodium hydroxide or potassium hydroxide to give a reaction mixture pH greater than 7 at a temperature of about 110° to about 130° C., for about 2 hours to about 3 hours to form an alkylphenol lignin product, extracting a portion of the alkylphenol lignin reaction product with toluene, drying the toluene insoluble product; and increasing the water solubility of the toluene insoluble product by a sulfomethylation reaction to produce the alkylphenol lignin surfactant;

injecting through the injection well a drive fluid to push the surfactant slug towards a production well; and recovering hydrocarbons at the production well.

* * * * *